(12) United States Patent  (10) Patent No.: US 9,200,730 B2
Cravero et al.  (45) Date of Patent: Dec. 1, 2015

(54) FATIGUE RESISTANT COILED TUBING

(71) Applicant: Tenaris Coiled Tubes, LLC, Houston, TX (US)

(72) Inventors: Sebastian Cravero, Buenos Aires (AR); Martin Valdez, Buenos Aires (AR); Jorge Mitre, Houston, TX (US); Hugo Alejandro Ernst, Buenos Aires (AR); Ricardo Schifini Gladchtein, Buenos Aires (AR)

(73) Assignee: TENARIS COILED TUBES, LLC, Houston, TX (US)

( * ) Notice: Subject to any disclaimer, the term of this patent is extended or adjusted under 35 U.S.C. 154(b) by 371 days.

(21) Appl. No.: 13/804,790

(22) Filed: Mar. 14, 2013

(65) Prior Publication Data

US 2014/0262337 A1    Sep. 18, 2014

(51) Int. Cl.
*F16L 9/16*    (2006.01)
*F16L 9/02*    (2006.01)
*B21C 37/08*   (2006.01)
*B21C 47/24*   (2006.01)
*B23K 31/02*   (2006.01)
*E21B 19/22*   (2006.01)

(52) U.S. Cl.
CPC .............. *F16L 9/02* (2013.01); *B21C 37/0826* (2013.01); *B21C 47/247* (2013.01); *B23K 31/02* (2013.01); *B23K 31/027* (2013.01); *E21B 19/22* (2013.01); *B23K 2201/16* (2013.01)

(58) Field of Classification Search
CPC .... B23K 33/006; B23K 31/027; B21C 37/09; B21C 37/08; B21C 37/101; B21C 37/0803; B21C 37/122; B21C 37/0826; B21D 51/10; E21B 17/08; E21B 19/22

USPC ......... 138/120, 128, 142, 150, 151, 154, 169, 138/170, 171; 175/320; 228/145
See application file for complete search history.

(56) References Cited

U.S. PATENT DOCUMENTS

| 1,450,935 | A | * | 4/1923 | Anderson | 403/270 |
| 3,029,504 | A | * | 4/1962 | Nielsen | 228/170 |
| 4,629,218 | A |   | 12/1986 | Dubois | |
| 4,841,616 | A | * | 6/1989 | Whitney | 29/890.049 |
| 4,863,091 | A |   | 9/1989 | Dubois | |
| 5,191,911 | A |   | 3/1993 | Dubois | |
| 5,456,405 | A |   | 10/1995 | Stagg | |
| 2005/0013954 | A1 | * | 1/2005 | Kaegi et al. | 428/36.9 |
| 2006/0157539 | A1 |   | 7/2006 | DuBois | |
| 2010/0095508 | A1 | * | 4/2010 | Wahlen et al. | 29/428 |
| 2012/0118426 | A1 |   | 5/2012 | Daniel et al. | |

* cited by examiner

*Primary Examiner* — Kenneth L Thompson
(74) *Attorney, Agent, or Firm* — Fish & Richardson P.C.

(57) ABSTRACT

The disclosed manufacture method for a length of tubing can produce a length of fatigue resistant tubing that has relatively high fatigue resistance and relatively low strip-to-strip welding length. The Fatigue resistance is calculated from experimental settings with controlled parameters and/or simulations reproducing similar material properties and loading conditions. A high fatigue resistance means certain product characteristics (e.g., low plasticization, low hydrostatic stress levels and free of imperfections welds) can be retained with an adequate bias weld design at low values after a specific test number of cyclic loading. The relatively low strip-to-strip welding length is an advantage for reducing probabilities of having cracks initiated and/or propagated at weld locations, where imperfections and localized differences of mechanical properties commonly cause failure. Low strip-to-strip welding length can also reduce the costs for welding.

34 Claims, 8 Drawing Sheets

FATIGUE RESISTANT COILED TUBING

BACKGROUND

This disclosure relates to metal tubing and methods of manufacture for same.

The metal tubing of this disclosure may be used in coiled tubing strings. Coiled tubing is a continuous length of spooled metal tubing. A metal tubing can in practice be formed from a flat composite metal strip that has been made from two individual strips welded end-to-end. The composite metal strip is then rolled into a cylindrical/tubular shape and seam-welded at the longitudinal edges to form a length of tubing. Coiled tubing can be produced in various lengths depending on specific application requirements, up to or exceeding 10,000 meters (or about 30,000 feet). Because of the coiled tubing's significant length, coiled tubing is commonly stored or transported on a reel.

During operation, coiled tubing is repeatedly spooled onto and unspooled from its reel. Coiled tubing is also under variable internal pressurizations, including super- and sub-atmospheric loads that result in various tension-compression stress and strain states. Additional loads to the coiled tubing can include bending loads (e.g., when spooled), axial loads (e.g., when supporting own gravity), and torsional loads (e.g., when twisted). Different stress and strain states can exist on different sections of coiled tubing. Variations in the stress and strain states can limit the coiled tubing's total life. For example, when coiled tubing is spooled out of a vertical well, the section at the reel is under bending loads, while the section inside the well is under axial loads. The cyclic loading of these various stress and strain states upon spooling and unspooling can result in a limited life due to fatigue.

The metal tubing's total life is measured by the number of spooling/unspooling cycles. Industry has established common coiled tubing life based on empirical data and theoretical predictions. Yet coiled tubing may still occasionally and prematurely fail when the cyclic loading causes cracks to initiate and/or propagate in the tubing. The cracks are usually located at or near a strip-to-strip weld, due to mechanical property differences between the weld and the strip's metal material. For example, fracture failures happen more often at strip-to-strip weld.

SUMMARY

This disclosure relates to a length of tubing and its manufacture methods.

In a first general aspect, a method of manufacturing a length of metal tubing comprises providing a first strip of metal material having a surface, a nominal width, a leading end, and a trailing end; providing a second strip of metal material having a surface, substantially the same nominal width as the first strip, a leading end, and a trailing end; trimming the leading end of the first strip of metal material with a bias cut profile beginning at a longitudinal edge of the first strip, said bias cut profile beginning with a first beta angle directed away from the trailing end of the first strip, as measured on the surface of the first strip from a first transverse plane perpendicular to a longitudinal axis of the first strip, said bias cut profile forming a continuous cut that transitions from the first beta angle to an alpha angle which is smaller than the first beta angle and directed away from the trailing end of the first strip, as measured on the surface of the first strip from a second transverse plane perpendicular to the longitudinal axis of the first strip, and then transitions from the alpha angle to a second beta angle which is larger than the first alpha angle and directed away from the trailing end of the first strip, as measured on the surface of the first strip from a third transverse plane perpendicular to the longitudinal axis of the first strip, and terminates at an opposite longitudinal edge of the first strip to form a trimmed leading end; trimming the trailing end of the second strip of metal material with a bias cut profile matching the trimmed leading end of the first strip, said bias cut profile beginning at a longitudinal edge of the second strip, said bias cut profile beginning with the first beta angle directed toward the leading end of the second strip, as measured on the surface of the second strip from a first transverse plane perpendicular to a longitudinal axis of the second strip, said bias cut profile forming a continuous cut that transitions from the first beta angle to the alpha angle which is smaller than the first beta angle and directed towards the leading end of the second strip, as measured on the surface of the second strip from a second transverse plane perpendicular to the longitudinal axis of the second strip, and then transitions from the alpha angle to the second beta angle which is larger than the alpha angle and directed towards the leading end of the second strip, as measured on the surface of the second strip from a third transverse plane perpendicular to the longitudinal axis of the second strip, and terminates at an opposite longitudinal edge of the second strip to form a trimmed trailing end; welding the trimmed leading end of the first strip to the trimmed trailing end of the second strip to form a composite strip with parallel longitudinal edges and substantially a uniform nominal width over its length; forming the composite strip into a tubular shape with the parallel longitudinal edges of the composite strip positioned adjacent to each other; and welding the longitudinal edges of the composite strip together to create the length of metal tubing.

The features of one of the below paragraphs 8-23, or the features of any combination of the below paragraphs 8-23, can be combined with said first general aspect.

In an embodiment of the first general aspect, the first beta angle and the second beta angle are substantially equal.

In an embodiment of the first general aspect, said bias cut profile begins with a first linear portion having said first beta angle, the first linear portion transitions to an intermediate linear portion having said alpha angle, and the intermediate portion transitions to a second linear portion having said second beta angle.

In an embodiment of the first general aspect, said bias cut profile beginning with the first beta angle transitions in a first continuous curve from the first beta angle to the alpha angle and then transitions from the alpha angle to the second beta angle in a second continuous curve.

In an embodiment of the first general aspect, the method comprises trimming the leading end of the first strip with the bias cut profile having the first and second beta angle between 50° and 80° and directing away from the trailing end of the first strip, as measured on the surface of the first strip from the first and third transverse plane perpendicular to the longitudinal axis of the first strip, respectively, and the method comprises trimming the trailing end of the second strip with the bias cut profile having the first and second beta angle between 50° and 80° and directing towards the leading end of the second strip, as measured on the surface of the second strip from the first and third transverse plane perpendicular to the longitudinal axis of the second strip, respectively.

In an embodiment of the first general aspect, the method comprises trimming the leading end of the first strip with the bias cut profile having the first and second beta angle between 55° and 65° and directing away from the trailing end of the first strip, as measured on the surface of the first strip from the first and third transverse plane perpendicular to the longitudinal axis of the first strip, respectively, and the method comprises trimming the trailing end of the second strip with the bias cut profile having the first and second beta angle between 55° and 65° and directing towards the leading end of the second strip, as measured on the surface of the second strip from the first and third transverse plane perpendicular to the longitudinal axis of the second strip.

In an embodiment of the first general aspect, the method comprises trimming the leading end of the first strip with the bias cut profile having the first and second beta angle at 60° and directing away from the trailing end of the first strip, as measured on the surface of the first strip from the first and third transverse plane perpendicular to the longitudinal axis of the first strip, respectively, and the method comprises trimming the trailing end of the second strip with the bias cut profile having the first and second beta angle at 60° and directing towards the leading end of the second strip, as measured on the surface of the second strip from the first and third transverse plane perpendicular to the longitudinal axis of the second strip, respectively.

In an embodiment of the first general aspect, the method comprises trimming the leading end of the first strip with the bias cut profile having the alpha angle between 15° and 45° and directing away from the leading end of the first strip, as measured on the surface of the first strip from the second transverse plane perpendicular to the longitudinal axis of the first strip, and the method comprises trimming the trailing end of the second strip with the bias cut profile having the alpha angle between 15° and 45° and directing towards the leading end of the second strip, as measured on the surface of the second strip from the second transverse plane perpendicular to the longitudinal axis of the second strip.

In an embodiment of the first general aspect, the method comprises trimming the leading end of the first strip with the bias cut profile having the alpha angle between 30° and 45° and directing away from the trailing end of the first strip, as measured on the surface of the first strip from the second transverse plane perpendicular to the longitudinal axis of the first strip, and the method comprises trimming the trailing end of the second strip with the bias cut profile having the alpha angle between 30° and 45° and directing towards the leading end of the second strip, as measured on the surface of the second strip from the second transverse line perpendicular to the longitudinal axis of the second strip.

In an embodiment of the first general aspect, the method comprises trimming the leading end of the first strip with the bias cut profile having the alpha angle at 37.5 degrees and directing away from the trailing end of the first strip, as measured on the surface of the first strip from the second transverse plane perpendicular to the longitudinal axis of the first strip, and the method comprises trimming the trailing end of the second strip with the bias cut profile having the alpha angle of the second strip at 37.5 degrees and directing towards the leading end of the second strip, as measured on the surface of the second strip from the second transverse line perpendicular to the longitudinal axis of the second strip.

In an embodiment of the first general aspect, in the first and second strip, the bias cut profile begins with a first linear portion having said first beta angle, the first linear portion transitions to an intermediate linear portion having said alpha angle, the intermediate linear portion transitions to a second linear portion having said second beta angle, and the bias cut profile comprises a smooth transition defined by a first rounding radius between the first linear portion and the intermediate portion and a smooth transition defined by a second rounding radius between the intermediate portion and the second linear portion.

In an embodiment of the first general aspect, in the first strip, the distance between the longitudinal edge and a first transition location where the bias cut profile transitions from the first beta angle to the alpha angle, as measured on the surface of the first strip in a direction perpendicular to the longitudinal axis of the first strip, is substantially the same as the distance between the opposite longitudinal edge and a second transition location where the bias cut profile transitions from the alpha angle to the second beta angle, as measured on the surface of the first strip in a direction perpendicular to the longitudinal axis of the first strip, and wherein in the second strip, the distance between the longitudinal edge and a first transition location where the bias cut profile transitions from the first beta angle to the alpha angle, as measured on the surface of the second strip in a direction perpendicular to the longitudinal axis of the second strip, is substantially the same as the distance between the opposite longitudinal edge and a second transition location where the bias cut profile transitions from the alpha angle to the second beta angle, as measured on the surface of the second strip in a direction perpendicular to the longitudinal axis of the second strip.

In an embodiment of the first general aspect, in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is substantially the same as the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is substantially the same as the distance between the longitudinal edge and said first transition location, as measured on the surface of the second strip in a direction perpendicular to the longitudinal axis of the second strip.

In an embodiment of the first general aspect, in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is larger than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is larger than the distance between the longitudinal edge and said first transition location, as measured on the surface of the second strip in a direction perpendicular to the longitudinal axis of the second strip.

In an embodiment of the first general aspect, in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is smaller than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is smaller than the distance between the longitudinal edge and said first transition location, as measured on the surface of the second strip in a direction perpendicular to the longitudinal axis of the second strip.

In an embodiment of the first general aspect, in the first strip, the distance between the first transition location where the bias cut profile transitions from the first beta angle to the alpha angle and the second transition location where the bias cut profile transitions from the alpha angle to the second beta angle, as measured on the surface of the first strip in a direction perpendicular to the longitudinal axis of the first strip, is extended to shorten the bias cut profile of the first strip, and wherein in the second strip, the distance between the first transition location where the bias cut profile transitions from the first beta angle to the alpha angle and the second transition location where the bias cut profile transitions from the alpha angle to the second beta angle, as measured on the surface of the second strip in a direction perpendicular to the longitudinal axis of the second strip, is extended to shorten the bias cut profile of the second strip.

In an embodiment of the first general aspect, in the first strip, the distance between the first transition location where the bias cut profile transitions from the first beta angle to the alpha angle and the second transition location where the bias cut profile transitions from the alpha angle to the second beta angle, as measured on the surface of the first strip in a direction perpendicular to the longitudinal axis of the first strip, is shortened to extend the bias cut profile of the first strip, and wherein in the second strip, the distance between the first transition location where the bias cut profile transitions from the first beta angle to the alpha angle and the second transition location where the bias cut profile transitions from the alpha angle to the second beta angle, as measured on the surface of the second strip in a direction perpendicular to the longitudinal axis of the second strip, is shortened to extend the bias cut profile of the second strip.

In a second general aspect, a length of metal tubing formed from strips metal welded together, said metal tubing comprises: a composite strip of metal having a longitudinal axis and parallel longitudinal edges, which composite strip is formed into a tubular form, said longitudinal edges being welded to each other to create the metal tubing; and wherein said composite strip comprises a first strip of metal material having an outer surface, a trailing end, and a trimmed leading end, said trimmed leading end having a bias cut profile beginning at a longitudinal edge of the first strip, said bias cut profile beginning with a first beta angle directed away from the trailing end of the first strip, as measured on the outer surface of the first strip from a first transverse plane perpendicular to the longitudinal axis of the composite strip, said bias cut profile forming a continuous cut that transitions from the first beta angle to an alpha angle which is smaller than the first beta angle and directed away from the trailing end of the first strip, as measured on the outer surface of the first strip from a second transverse plane perpendicular to the longitudinal axis of the composite strip, and then transitions from the alpha angle to a second beta angle which is larger than the first alpha angle and directed away from the trailing end of the first strip, as measured on the outer surface of the first strip from a third transverse plane perpendicular to the longitudinal axis of the composite strip, and terminates at an opposite longitudinal edge of the first strip to form a trimmed leading end of the first strip, and a second strip of metal material having an outer surface, a leading end and a trimmed trailing end matching the trimmed leading end of the first strip, said trimmed trailing end having a bias cut profile beginning at a longitudinal edge of the second strip, said bias cut profile beginning with the first beta angle directed towards the leading end of the second strip, as measured on the outer surface of the second strip from a first transverse plane perpendicular to the longitudinal axis of the composite strip, said bias cut profile forming a continuous cut that transitions from the first beta angle to the alpha angle which is smaller than the first beta angle and directed toward the leading end of the second strip (or which is zero), as measured on the outer surface of the second strip from a second transverse plane perpendicular to the longitudinal axis of the composite strip, and then transitions from the alpha angle to the second beta angle which is larger than the first alpha angle and directed towards the leading end of the second strip, as measured on the outer surface from a third transverse plane perpendicular to the longitudinal axis of the composite strip, and terminates at an opposite longitudinal edge of the second strip to form a trimmed trailing end of the second strip, and wherein the trimmed leading end of the first strip is welded to the trimmed trailing end of the second strip.

The features of one of the below paragraphs 26-39, or the features of any combination of the below paragraphs 26-39, can be combined with said second general aspect.

In an embodiment of the second general aspect, the first beta angle and the second beta angle are substantially equal.

In an embodiment of the second general aspect, said bias cut profile begins with a first linear portion having said first beta angle and partly surrounding the longitudinal axis of the composite strip, the first linear portion transitions to an intermediate linear portion having said alpha angle and partly surrounding the longitudinal axis of the composite strip, and the intermediate linear portion transitions to a second linear portion having said second beta angle and partly surrounding the longitudinal axis of the composite strip.

In an embodiment of the second general aspect, said bias cut profile beginning with the first beta angle transitions in a first continuous curve from the first beta angle to the alpha angle and then transitions from the alpha angle to the second beta angle in a second continuous curve.

In an embodiment of the second general aspect, the first and second beta angle of the bias cut profile of the first strip is between 50° and 80° and directing away from the trailing end of the first strip, as measured on the surface of the first strip from the first and third transverse plane perpendicular to the longitudinal axis of the composite strip, respectively, and the first and second beta angle of the bias cut profile of the second strip is between 50° and 80° and directing towards the leading end of the second strip, as measured on the surface of the second strip from the first and third transverse plane perpendicular to the longitudinal axis of the composite strip, respectively In an embodiment of the second general aspect, the first and second beta angle of the bias cut profile of the first strip is between 55° and 65° and directing away from the trailing end of the first strip, as measured on the surface of the first strip from the first and third transverse plane perpendicular to the longitudinal axis of the composite strip, respectively, and the first and second beta angle of the bias cut profile of the second strip is between 55° and 65° and directing towards the leading end of the second strip, as measured on the surface of the second strip from the first and third transverse plane perpendicular to the longitudinal axis of the composite strip, respectively In an embodiment of the second general aspect, the first and second beta angle of the bias cut profile of the first strip is 60° and directing away from the trailing end of the first strip, as measured on the surface of the first strip from the first and third transverse plane perpendicular to the longitudinal axis of the composite strip, respectively, and the first and second beta angle of the bias cut profile of the second strip is 60° and directing towards the leading end of the second strip, as measured on the surface of the second strip from the first and third transverse plane perpendicular to the longitudinal axis of the composite strip, respectively In an embodiment of the second general aspect, the alpha angle of the bias cut profile of the first strip is between 15° and 45° and directing away from the trailing end of the first strip, as measured on the surface of the first strip from the second transverse plane perpendicular to the longitudinal axis of the composite strip, and the alpha angle of the bias cut profile of the second strip is between 15° and 45° and directing towards the leading end of the second strip, as measured on the surface of the second strip from the second transverse plane perpendicular to the longitudinal axis of the composite strip.

In an embodiment of the second general aspect, the alpha angle of the bias cut profile of the first strip is between 30° and 45° and directing away from the trailing end of the first strip, as measured on the surface of the first strip from the second transverse plane perpendicular to the longitudinal axis of the composite strip, and the alpha angle of the bias cut profile of the second strip is between 30° and 45° and directing towards the leading end of the second strip, as measured on the surface of the second strip from the second transverse plane perpendicular to the longitudinal axis of the composite strip.

In an embodiment of the second general aspect, the alpha angle of the bias cut profile of the first strip is 37.5° and directing away from the trailing end of the first strip, as measured on the surface of the first strip from the second transverse line perpendicular to the longitudinal axis of the composite strip, and the beta angle of the bias cut profile of the second strip is 37.5° and directing towards the leading end of the second strip, as measured on the surface of the second strip from the second transverse plane perpendicular to the longitudinal axis of the composite strip.

In an embodiment of the second general aspect, in the first and second strip, the bias cut profile begins with a first linear portion having said first beta angle and partly surrounding the longitudinal axis of the composite strip, the first linear portion transitions to an intermediate linear portion having said alpha angle and partly surrounding the longitudinal axis of the composite strip, the intermediate linear portion transitions to a second linear portion having said second beta angle and partly surrounding the longitudinal axis of the composite strip, and the bias cut profile comprises a smooth transition defined by a first rounding radius between the first linear portion and the intermediate portion and a smooth transition defined by a second rounding radius between the intermediate portion and the second linear portion.

In an embodiment of the second general aspect, in the first strip, the distance of between the longitudinal edge and the transverse a first transition location where the bias cut profile transitions from the first beta angle to the alpha angle to the longitudinal edge, as measured on the surface of the first strip in a direction perpendicular to the longitudinal axis of the first strip, is substantially the same as the distance of between the opposite longitudinal edge and a the transverse second transition location where the bias cut profile transitions from the alpha angle back to the second beta angle to the opposite longitudinal edge, as measured on the surface of the first strip in a direction perpendicular to the longitudinal axis of the first strip, and wherein. in the second strip, the distance between the longitudinal edge and a first transition location where the bias cut profile transitions from the first beta angle to the alpha angle, as measured on the surface of the second strip in a direction perpendicular to the longitudinal axis of the second strip, is substantially the same as the distance between the opposite longitudinal edge and a second transition location where the bias cut profile transitions from the alpha angle to the second beta angle, as measured on the surface of the second strip in a direction perpendicular to the longitudinal axis of the second strip.

In an embodiment of the second general aspect, in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is substantially the same as the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is substantially the same as the distance between the longitudinal edge and said first transition location, as measured on the surface of the second strip in a direction perpendicular to the longitudinal axis of the second strip.

In an embodiment of the second general aspect, in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is larger than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is larger than the distance between the longitudinal edge and said first transition location, as measured on the surface of the second strip in a direction perpendicular to the longitudinal axis of the second strip.

In an embodiment of the second general aspect, in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is smaller than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is smaller than the distance between the longitudinal edge and said first transition location, as measured on the surface of the second strip in a direction perpendicular to the longitudinal axis of the second strip.

In another general aspect, a method of manufacturing a continuous length of coiled tubing string is disclosed. The method comprises: manufacturing a length of metal tubing comprising: providing a first strip of metal material having a surface, a nominal width, a leading end, and a trailing end; providing a second strip of metal material having a surface, substantially the same nominal width as the first strip, a leading end, and a trailing end; trimming the leading end of the first strip of metal material with a bias cut profile beginning at a longitudinal edge of the first strip, said bias cut profile beginning with a first beta angle directed away from the trailing end of the first strip, as measured on the surface of the first strip from a first transverse plane perpendicular to a longitudinal axis of the first strip, said bias cut profile forming a continuous cut that transitions from the first beta angle to an alpha angle which is smaller than the first beta angle and directed away from the trailing end of the first strip as measured on the surface of the first strip from a second transverse plane perpendicular to the longitudinal axis of the first strip, and then transitions from the alpha angle to a second beta angle which is larger than the first alpha angle and directed away from the trailing end of the first strip, as measured on the surface of the first strip from a third transverse plane perpendicular to the longitudinal axis of the first strip, and terminates at an opposite longitudinal edge of the first strip to form a trimmed leading end; trimming the trailing end of the second strip of metal material with a bias cut profile matching the trimmed leading end of the first strip, said bias cut profile beginning at a longitudinal edge of the second strip, said bias cut profile beginning with the first beta angle directed toward the leading end of the second strip, as measured on the surface of the second strip from a first transverse plane perpendicular to a longitudinal axis of the second strip, said bias cut profile forming a continuous cut that transitions from the first beta angle to the alpha angle which is smaller than the first beta angle and directed towards the leading end of the second strip, as measured on the surface of the second strip from a second transverse plane perpendicular to the longitudinal axis of the second strip, and then transitions from the alpha angle to the second beta angle which is larger than the alpha angle and directed towards the leading end of the second strip, as measured on the surface of the second strip from a third transverse plane perpendicular to the longitudinal axis of the second strip, and terminates at an opposite longitudinal edge of the second strip to form a trimmed trailing end; welding the trimmed leading end of the first strip to the trimmed trailing end of the second strip to form a composite strip with parallel longitudinal edges and substantially a uniform nominal width over its length; forming the composite strip into a tubular shape with the parallel longitudinal edges of the composite strip positioned adjacent to each other; welding the longitudinal edges of the composite strip together to create the length of metal tubing; welding a plurality of the lengths of tubing together end to end thereby forming a continuous string of tubing; spooling the tubing onto a spool thereby forming a coiled tubing string.

In another general aspect, a method of using a continuous length of a coiled tubing string in a wellbore is disclosed. The method comprises: manufacturing a length of metal tubing comprising: providing a first strip of metal material having a surface, a nominal width, a leading end, and a trailing end; providing a second strip of metal material having a surface, substantially the same nominal width as the first strip, a leading end, and a trailing end; trimming the leading end of the first strip of metal material with a bias cut profile beginning at a longitudinal edge of the first strip, said bias cut profile beginning with a first beta angle directed away from the trailing end of the first strip, as measured on the surface of the first strip from a first transverse plane perpendicular to a longitudinal axis of the first strip, said bias cut profile forming a continuous cut that transitions from the first beta angle to an alpha angle which is smaller than the first beta angle and directed away from the trailing end of the first strip as measured on the surface of the first strip from a second transverse plane perpendicular to the longitudinal axis of the first strip, and then transitions from the alpha angle to a second beta angle which is larger than the first alpha angle and directed away from the trailing end of the first strip, as measured on the surface of the first strip from a third transverse plane perpendicular to the longitudinal axis of the first strip, and terminates at an opposite longitudinal edge of the first strip to form a trimmed leading end; trimming the trailing end of the second strip of metal material with a bias cut profile matching the trimmed leading end of the first strip, said bias cut profile beginning at a longitudinal edge of the second strip, said bias cut profile beginning with the first beta angle directed toward the leading end of the second strip, as measured on the surface of the second strip from a first transverse plane perpendicular to a longitudinal axis of the second strip, said bias cut profile forming a continuous cut that transitions from the first beta angle to the alpha angle which is smaller than the first beta angle and directed towards the leading end of the second strip, as measured on the surface of the second strip from a second transverse plane perpendicular to the longitudinal axis of the second strip, and then transitions from the alpha angle to the second beta angle which is larger than the alpha angle and directed towards the leading end of the second strip, as measured on the surface of the second strip from a third transverse plane perpendicular to the longitudinal axis of the second strip, and terminates at an opposite longitudinal edge of the second strip to form a trimmed trailing end; welding the trimmed leading end of the first strip to the trimmed trailing end of the second strip to form a composite strip with parallel longitudinal edges and substantially a uniform nominal width over its length; forming the composite strip into a tubular shape with the parallel longitudinal edges of the composite strip positioned adjacent to each other; welding the longitudinal edges of the composite strip together to create the length of metal tubing; welding a plurality of the lengths of tubing together end to end thereby forming a continuous string of tubing; spooling the continuous tubing onto a spool thereby forming a continuous coiled tubing string; positioning the spool with the coiled tubing strings pooled thereon proximal to a wellbore; disposing a distal end of the coiled tubing string into the upper end of the wellbore; unspooling portions of the continuous coiled tubing string from the spool and simultaneously lowering the distal end of the coiled tubing string into the wellbore; pumping fluid into the proximal end of the coiled tubing string and through the coiled tubing string and through the distal end of the tubing string disposed in the wellbore.

A number of examples and implementations have been described. Never the less, it will be understood that various modifications may be made that would include more or less elements and various combinations of the elements and still fall within the scope of this invention. Moreover, the methods of this invention may include fewer steps that those illustrated or more steps that those illustrated, in addition the steps may be performed in the respective order or in different orders than that illustrated. Accordingly other implementations are within the scope of this invention The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This disclosure relates to a length of metal tubing and methods of manufacture.

In general, in wellbore-related operations, e.g. drilling, a coiled metal tube undergoes cyclic loading as a result of being repeatedly spooled onto and/or unspooled from a reel and under various pressurizations. The number of cycles of spooling and unspooling without failure (e.g., cracking or otherwise leaking) can indicate the life of a metal tube. Premature failure occurs when cracks initiate and propagate in the coiled metal tube, usually at proximities of a strip-to-strip weld. The crack initiation can be a result of certain stress and strain states, as well as imperfections in the weld. This disclosure describes a length of coilabe metal tubing having a cut profile at the strip-to-strip weld favoring a fatigue resistant stress and strain state, and at the same time having a short weld length to reduce probabilities of imperfections. In metal tubing, metal strips are known to be joint welded at a simple straight cut profile with a certain angle (e.g., 0°, 30°, 45°, etc.); the greater the angle, the longer the weld length and the greater the fatigue resistance (e.g., a weld of 60° offers a better fatigue resistance than a weld of 45°). This disclosure describes a cut profile that achieves a high fatigue resistance while shortening the weld length. This can optimize the cut profile to enhance fatigue resistance.

The disclosed manufacture method can produce a length of fatigue resistant tubing that has relatively high fatigue resistance and relatively low strip-to-strip welding length. The fatigue resistance is calculated from experimental settings with controlled parameters and/or simulations reproducing similar material properties and loading conditions. A high fatigue resistance means certain product characteristics (e.g., low plasticization, low hydrostatic stress levels and free of imperfections welds) can be retained with an adequate bias weld design at low values after a specific test number of cyclic loading. The relatively low strip-to-strip welding length is an advantage for reducing probabilities of having cracks initiated and/or propagated at weld locations, where imperfections and localized differences of mechanical properties commonly cause failure. Low strip-to-strip welding length can also reduce the costs for welding.

Figure 1:
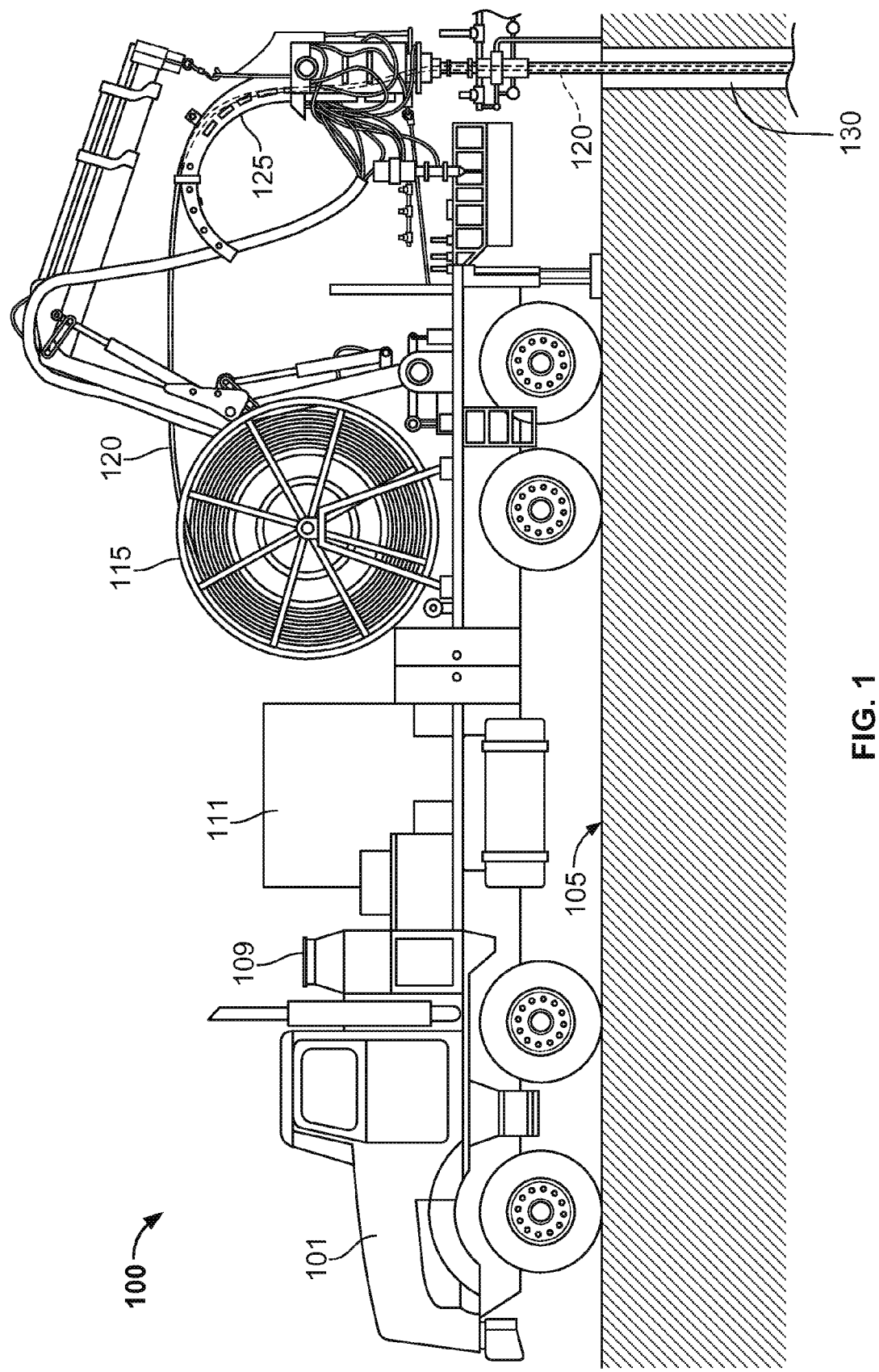
FIG. 1 is a schematic view of a truck mounted coiled tubing unit used to spool a continuous metal tube in and out of a wellbore.

FIG. 1 is a schematic side view of a truck mounted coiled tubing unit 100 used to spool a continuous length of tubing into or out of a wellbore. In the implementation illustrated, the coiled tubing unit 100 is operated on a land surface 105 and extends or retracts a metal tubing string (hereinafter referred to as "coiled tubing") 120 into or from a well 130 respectively. The coiled tubing unit 100 as illustrated provides coiled tubing 120 to a well site using a truck 101. The truck 101 carries a tubing reel 115 that stores the coiled tubing 120 by spooling the coiled tubing 120 evenly onto the tubing reel 115. The coiled tubing 120 can be further supported by a guide 125. One end of the coiled tubing 120 is connected to the center axis of the tubing reel 115 in a reel plumbing source that enables fluids to be communicated into the coiled tubing 120 while permitting the tubing reel 115 to rotate. The other end of the coiled tubing 120 is placed into the well 130. The truck 101 also carries control equipment 111 and a power source 109 for operations to spool and/or unspool the coiled tubing 120 at various speeds and depths. In other instances, the coiled tubing unit 100 may be a stationary structure on the ground (e.g., permanently installed), or carried on a trailer, skid, or other mobile platforms. In other implementations a coiled tubing unit may be skid mounted and used on an offshore platform or drill ship on a water surface above a subsea wellbore.

Figures 2A, 2B:
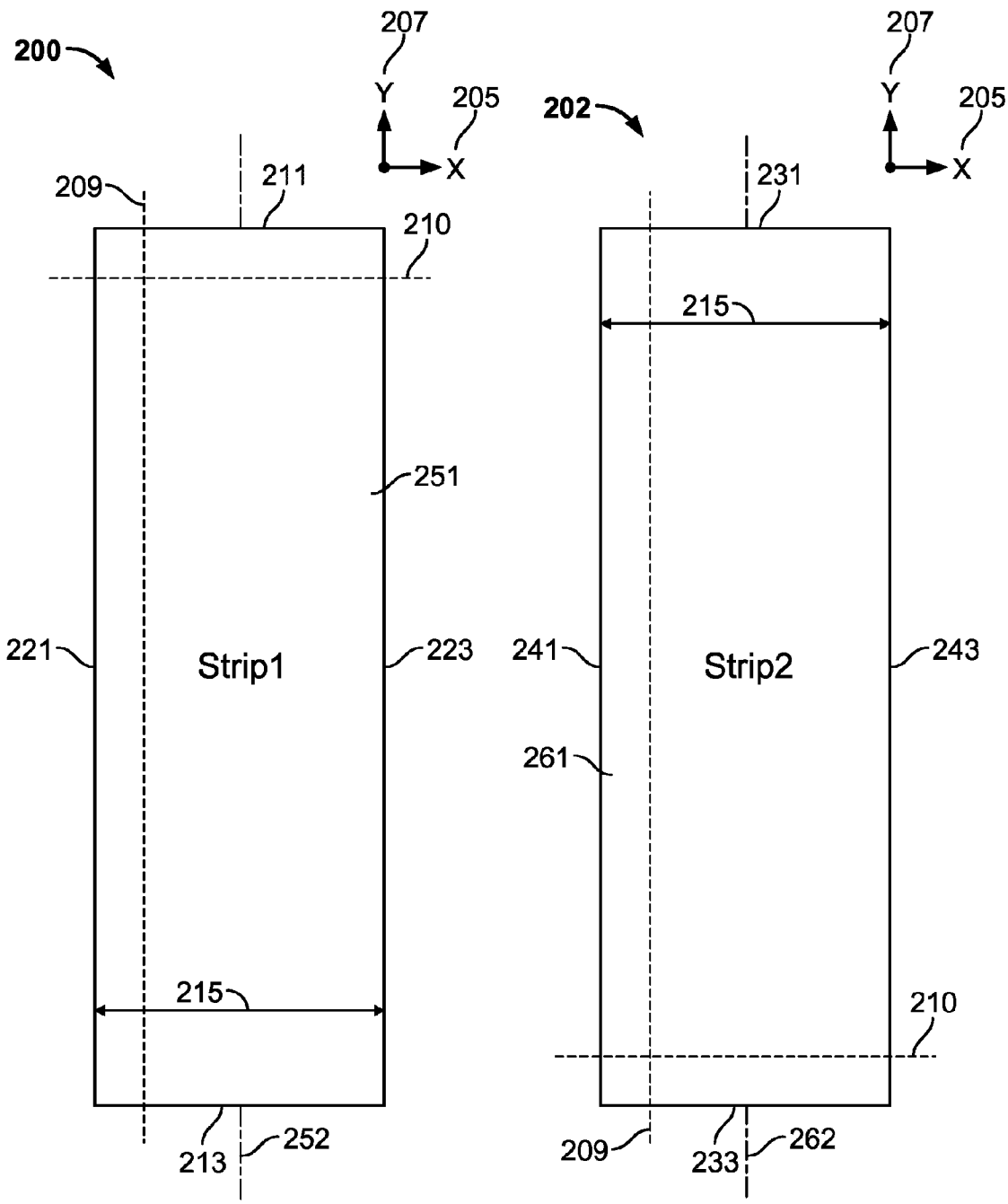
FIGS. 2A and 2B are top views of two metal strips used to manufacture a metal tube.

FIGS. 2A and 2B are front views of two metal strips 200 and 202 used to manufacture a fatigue resistant metal tubing. FIG. 2A shows a first strip 200 having a leading end 213, a trailing end 211, a longitudinal edge 221, an opposite longitudinal edge 223, and a surface 251. The first strip 200 has a nominal width 215 (e.g., 160 mm) and a nominal thickness (e.g., 4.89 mm) suitable for making metal tubes. FIG. 2B shows a second strip 202 having a leading end 233, a trailing end 231, a longitudinal edge 241, an opposite longitudinal edge 243, and a surface 261. The second strip 202 has substantially the same nominal width 215 and nominal thickness as the first strip 200. For example, the two strips 200 and 202 can be made from the same manufacturing process to achieve the same nominal thickness and width within a specific range of tolerance and dimension errors; though in some instances, the two strips 200 and 202 can have different thicknesses, such as for tapered coiled tubing. The two strips 200 and 202 can be aligned in the same longitudinal direction 209 defined using a coordinate axis y 207. A transverse direction 210 can be defined using the coordinate axis x 205 perpendicular to the axis y 207. As described below, indefinite transverse planes may in each of the first and second strip 200, 202 be drawn perpendicular to the longitudinal axes 252, 262 of the two strips 200, 202 (and parallel to the transverse direction 210) for angle measurement purposes. In each of the first and second strip 200, 202, the longitudinal axis extends parallel to the longitudinal direction 209.

Figures 3A, 3B:
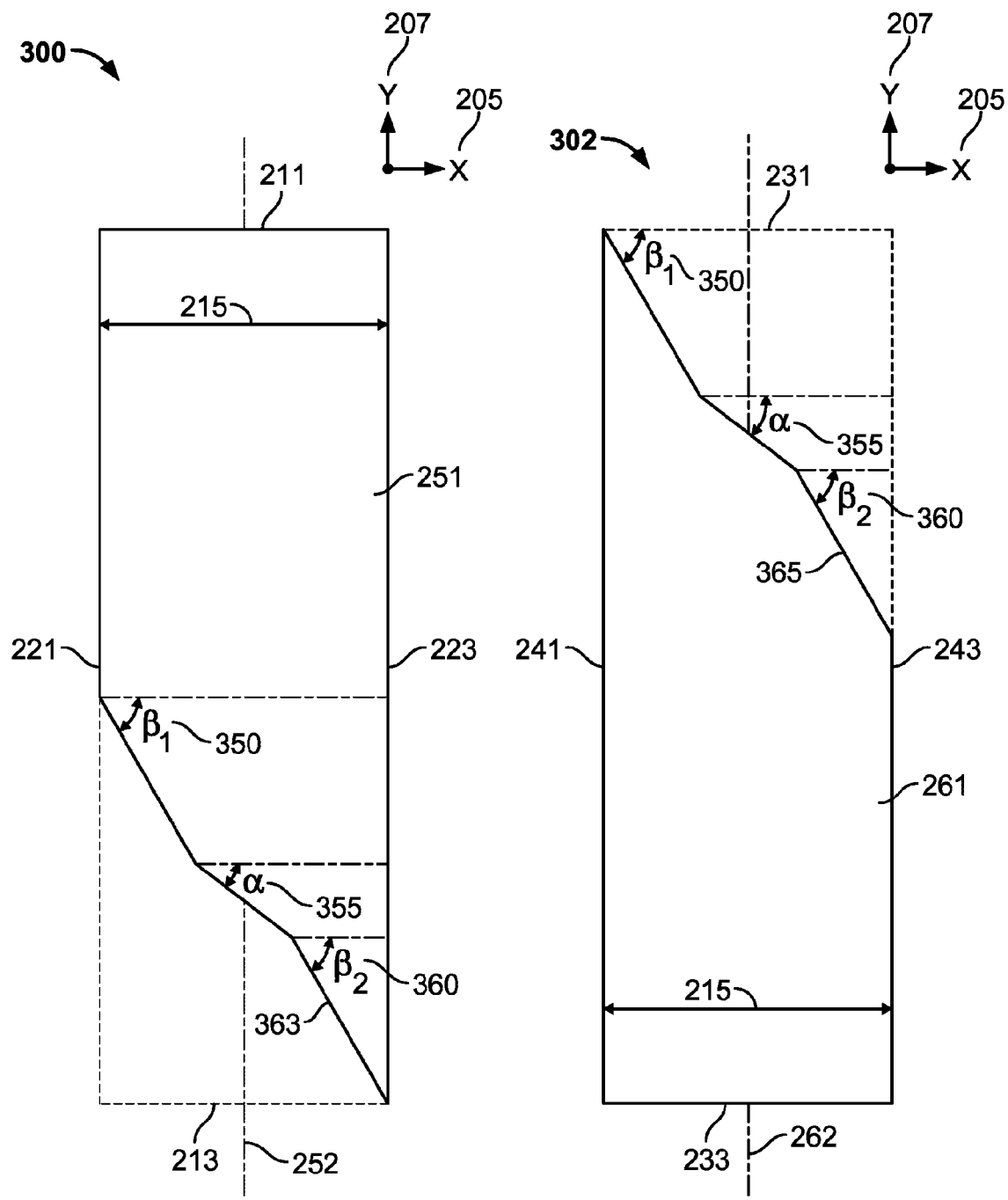
FIGS. 3A and 3B are front views of the two metal strips being bias cut profile to manufacture the metal tube.

FIGS. 3A and 3B are front views of the two metal strips 300 and 302 being bias cut profile to manufacture the metal tube. In FIG. 3A, the metal strip 300 is bias cut profile from the metal strip 200 of FIG. 2A. The leading end 213 is trimmed with a bias cut profile beginning at the longitudinal edge 221 with a first beta angle 350 (illustrated as $\beta_1$) directed away from the trailing end 211. The first beta angle 350 is measured on the surface 251 of the first strip 300 from a first transverse plane perpendicular to the longitudinal axis 252 of the first strip 300 (i.e., parallel to the x axis 205). The bias cut profile then transitions from the first beta angle 350 to an alpha angle 355 which is smaller than the first beta angle 350 and directed away from the trailing end 211. The alpha angle 355 is measured on the surface 251 of the first strip 300 from a second transverse plane perpendicular to the longitudinal axis 252. The bias cut profile further transitions continuously from the alpha angle 355 to a second beta angle 360 (illustrated as $\beta_2$) which is larger than the first alpha angle 355 and directed away from the trailing end 211. The second beta angle 360 is measured on the surface 251 of the first strip 300 from a third transverse plane perpendicular to the longitudinal axis 252. In the implementation illustrated in FIGS. 3A, 3B, 4, and 5, the second beta angle 360 is substantially equal to the first beta angle 350; though the second beta angle 360 can also be different than the first beta angle 350 in some circumstances. In the following discussion, the first beta angle 350 is presumed to be the same as the second beta angle 360 (with an illustrative exception shown in FIG. 6). The first beta angle 350 and the second beta angle 360 are both generally greater than the alpha angle. The bias cut profile terminates at the opposite longitudinal edge 223, forming a trimmed leading end 363. In FIG. 3B, similar to the metal strip 300, the trailing end 231 is trimmed of metal strip 302 with a bias cut profile matching the bias cut profile of the trimmed leading end 363 of the first strip 300: the bias cut profile of the second strip 302 begins at the longitudinal edge 241 with the first beta angle 350 directed towards the leading end 233, as measured on the surface 261 of the second strip 302 from a first transverse plane perpendicular to the longitudinal axis 262. The bias cut profile subsequently transitions from the first beta angle 350 to the alpha angle 355 directed towards the leading end 233, as measured on the surface 261 of the second strip 302 from a second transverse plane perpendicular to the longitudinal axis 262, and further transitions from the alpha angle 355 to the second beta angle 350 directed towards the leading end 233, as measured on the surface 261 of the second strip 302 from a third transverse plane perpendicular to the longitudinal axis 262. The bias cut profile terminates at the opposite longitudinal edge 243 and forms a trimmed trailing end 365.

The continuous bias cut profile beginning with the first beta angle 350 can include a first linear portion between the first beta angle 350 and the alpha angle 355, and a second linear portion between the alpha angle 355 and the second beta angle 360 (as later illustrated in FIG. 4). In some implementations, the continuous bias cut profile can include a first continuous curve as a transition between the first beta angle 350 and the alpha angle 355, and a second continuous curve as a transition between the alpha angle 355 and the second beta angle 360 (as later illustrated in FIG. 5).

In FIGS. 3A and 3B, the first beta angle 350 is illustrated to be 60° and directing away from the trailing end of the first strip as measured on the surface 251 of the strip 200 from the first and third transverse plane perpendicular to the longitudinal axis 213 of the first strip 200, respectively. In some implementations, the first beta angle 350 can be selected from a wider range, such as between 55° and 65°. In some other implementations, the first beta angle 350 may be selected from an even wider range, such as between 50° and 80°. The second beta angle 360 can be substantially equal to the first beta angle 350. The alpha angle 355 is illustrated to be 37.5°, directing away from the trailing end of the first strip 200 as measured on the surface 251 of the first strip 200 from the second transverse plane perpendicular to the longitudinal axis 252 of the first strip. In some implementations, the alpha angle 355 can be selected from a wider range, such as between 30° and 45°. In some other implementations, the alpha angle 355 may be selected from an even wider range, such as between 15° and 45°.

Figure 9:
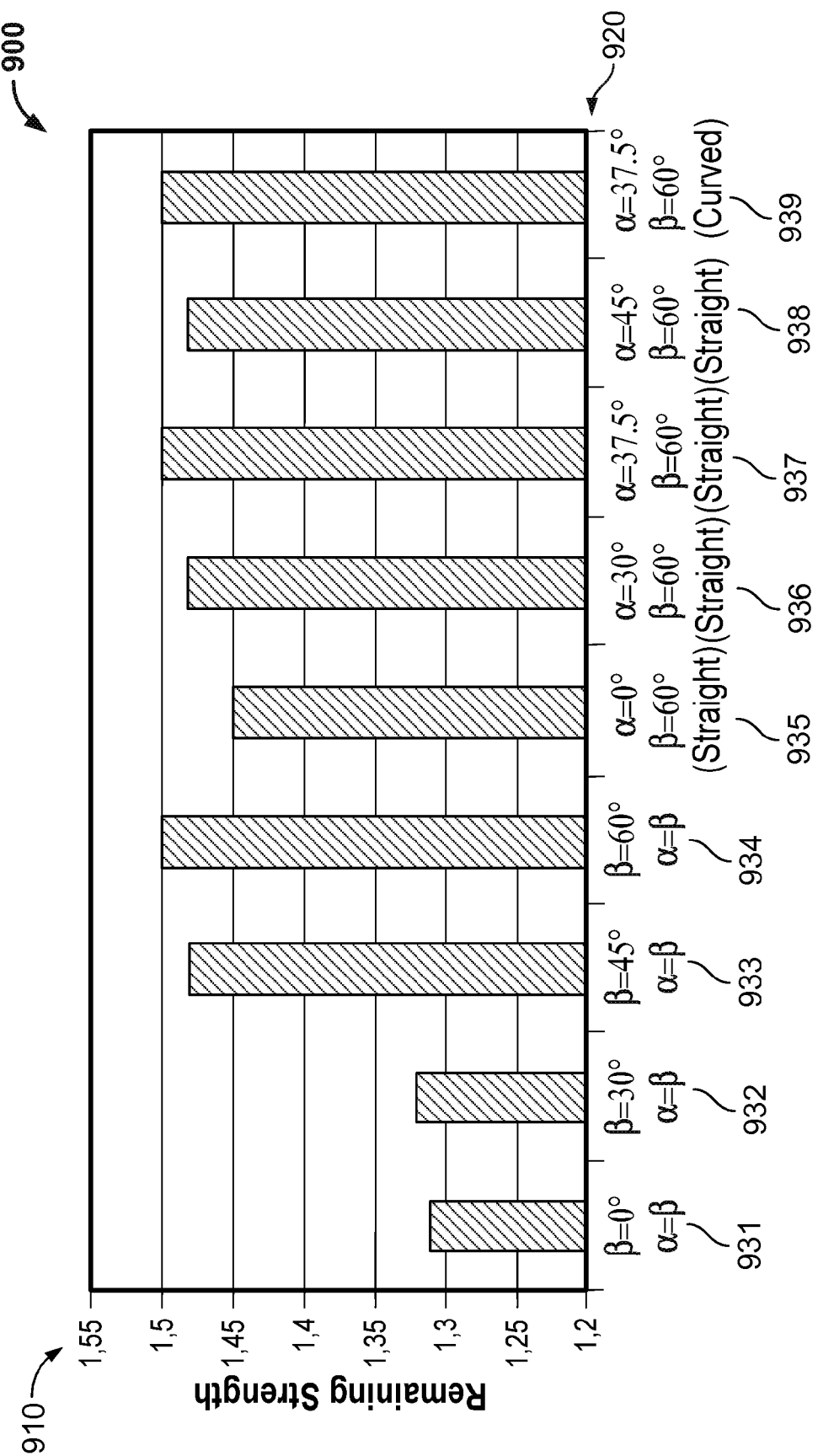
FIG. 9 is a bar chart illustrating analysis of fatigue resistance of metal tubing of various bias cut profiles.

In general, the higher the first beta angle 350 and the alpha angle 355, the higher is the fatigue resistance of the manufactured metal tube; and the longer is the strip-to-strip weld line between the strip 300 and the strip 302. An example study is illustrated in FIG. 9, where the first four cases 931, 932, 933 and 934 show an increase trend of fatigue resistance (as indicated by remaining strength after a loading cycle) as the first beta angle 350 and the alpha angle 355 both increase. A longer strip-to-strip weld line may correspond with a higher probability of imperfections in the weld line, as well as a higher manufacturing cost. For example, a high beta angle and a high alpha angle may result in a robust metal tube having a high fatigue resistance. But the high beta angle and the high alpha angle may require a long bias cut profile and a long weld line, increasing the probability of weld imperfections as well as the cost of welding.

A low beta angle and a low alpha angle may have benefits of a short bias cut profile and weld, but the fatigue resistance may also be lowered. The first beta angle 350 and the alpha angle 355 can thus be optimized for structural robustness and/or manufacture cost. For example, a combination of a high first beta angle (e.g., 60°) and a low alpha angle (e.g., 37.5°) can achieve a balanced result between a high fatigue resistance and a short length of weld line (i.e., a short length of bias cut profile). For instance, the two sections of the zigzag cut profile of the high first beta angle can achieve a high fatigue resistance close to the electric resistance welding (ERW) zone (a very critical zone) and the other section of the zigzag cut profile of the low alpha angle reduces the length of bias cut profile. The ERW zone relates to the connection of the longitudinal edge 221 or 241 and the opposite longitudinal edge 223 or 243, respectively. As further discussed in FIG. 4, the length of each section with a certain cut angle in the cut profile may be optimized to achieve a balanced result.

Figures 4, 5:
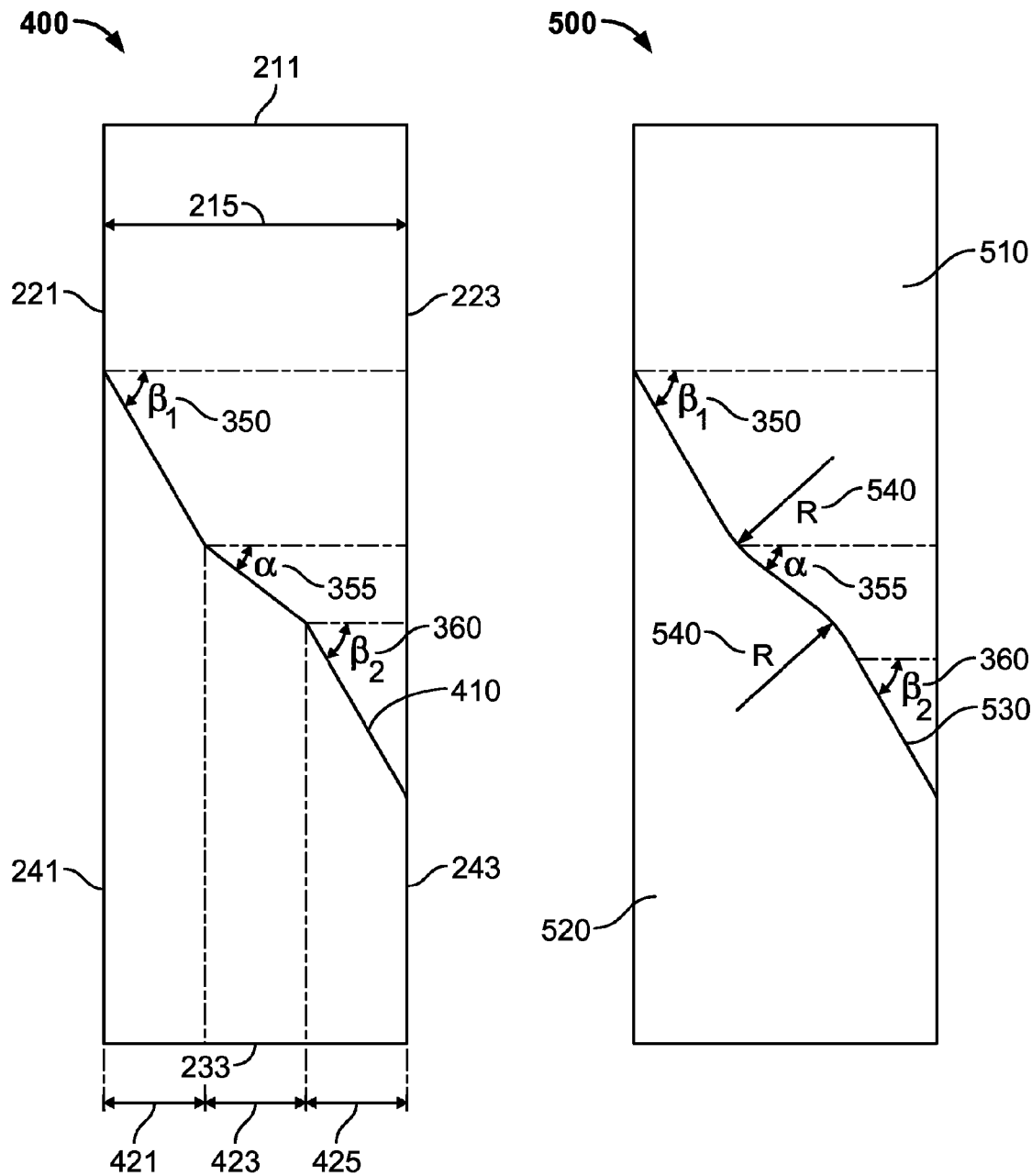
FIG. 4 is a front view of the two metal strips welded at the bias cut profile shown in FIGS. 3A and 3B.
FIG. 5 is a front view of two metal strips welded using an alternative bias cut profile.

FIG. 4 is a front view of the two metal strips 300 and 302 welded at the cut profile 410. The cut profile 410 is formed from joining the trimmed leading end 363 of the metal strip 300 with the trimmed trailing end 365 of the metal strip 302 together such that the two bias cut profile ends engage. For example, the bias cut profile is where the strip-to-strip weld line will be located. The two bias cut profile ends dot not overlap as illustrated; though they can overlap in certain instances (e.g., overlapping can build up wall thickness at the weld, as opposed to butting to have a single layer of wall thickness). The trimmed leading end 363 is welded to the trimmed trailing end 365 to form a composite strip 400. The composite strip 400 has parallel longitudinal edges aligning the longitudinal edges 221 and 241 and aligning the opposite longitudinal edges 223 and 243. The composite strip 400 overall has the same nominal width 215 as the strip 300 or 302 before welding. In some implementations, the composite strip 400 may be welded with other composite strips or regular strips to have the leading end 233 and trailing end 211 trimmed by the same bias cut profile and weld with other strips to form a longer composite strip.

In some implementations, the cut profile 410 may be varied with different angle transition locations (e.g., variable positions of the transition from the first beta angle to the alpha angle, and from the alpha angle to the second beta angle). For example, the distance 421 between the first angle transition to the longitudinal edge 241, and the distance 425 between the second angle transitions to the opposite longitudinal edge 243 can be varied based on different priority or designed property. The distance 423 is the transverse dimension between the first angle transition and the second angle transition (i.e., the distance 423 equals the width 215 subtracted by the distances 421 and 425). In FIG. 4, the distances 421, 423 and 425 are shown to be equal. In some implementations, the distances 421, 423, and 425 may vary. For example, when shortening the overall weld length is prioritized, the distance 423 may be extended. Or when a high fatigue resistance is prioritized, the distance 423 may be shortened. The distances 421 and 425 may be maintained equal. That is, the distance 421 from the transverse location where the bias cut profile transitions from the first beta angle 350 to the alpha angle 355 to the longitudinal edge is substantially the same as the distance 425 from the transverse location where the bias cut profile transitions from the alpha angle 355 back to the first beta angle 350 to the opposite longitudinal edge. In some implementations, the distances 421 and 425 may be different.

FIG. 5 is a front view of two metal strips 510 and 520 welded into a composite strip 500 using an alternative cut profile 530. The cut profile 530 has smoothly curved transitions between continuous cut lines of different angles. For example, at the transition where the cut profile 530 changes from the first beta angle 350 to the alpha angle 355, a continuous curve tangentially connects the cut. In some instances, the curve may be an arc of a circle and may be defined by a rounding radius 540. The curve can avoid stress concentration that would otherwise exist were the transition made with straight lines. The smooth transition of the cut profile 530 can thus further reduce the probability of crack initiation and/or propagation. At the transition where the cut profile 530 changes from the alpha angle to the second beta angle, another continuous curve is used for a smoothly continuous transition. The first continuous curve and the second continuous curve may have the same rounding radius 540, and be connected with a straight cut or may be directly connected to form an "S" shape (e.g., the two continuous curves are tangentially connected). In some implementations, the first continuous curve and the second continuous curve may have different rounding radii.

Figure 6:
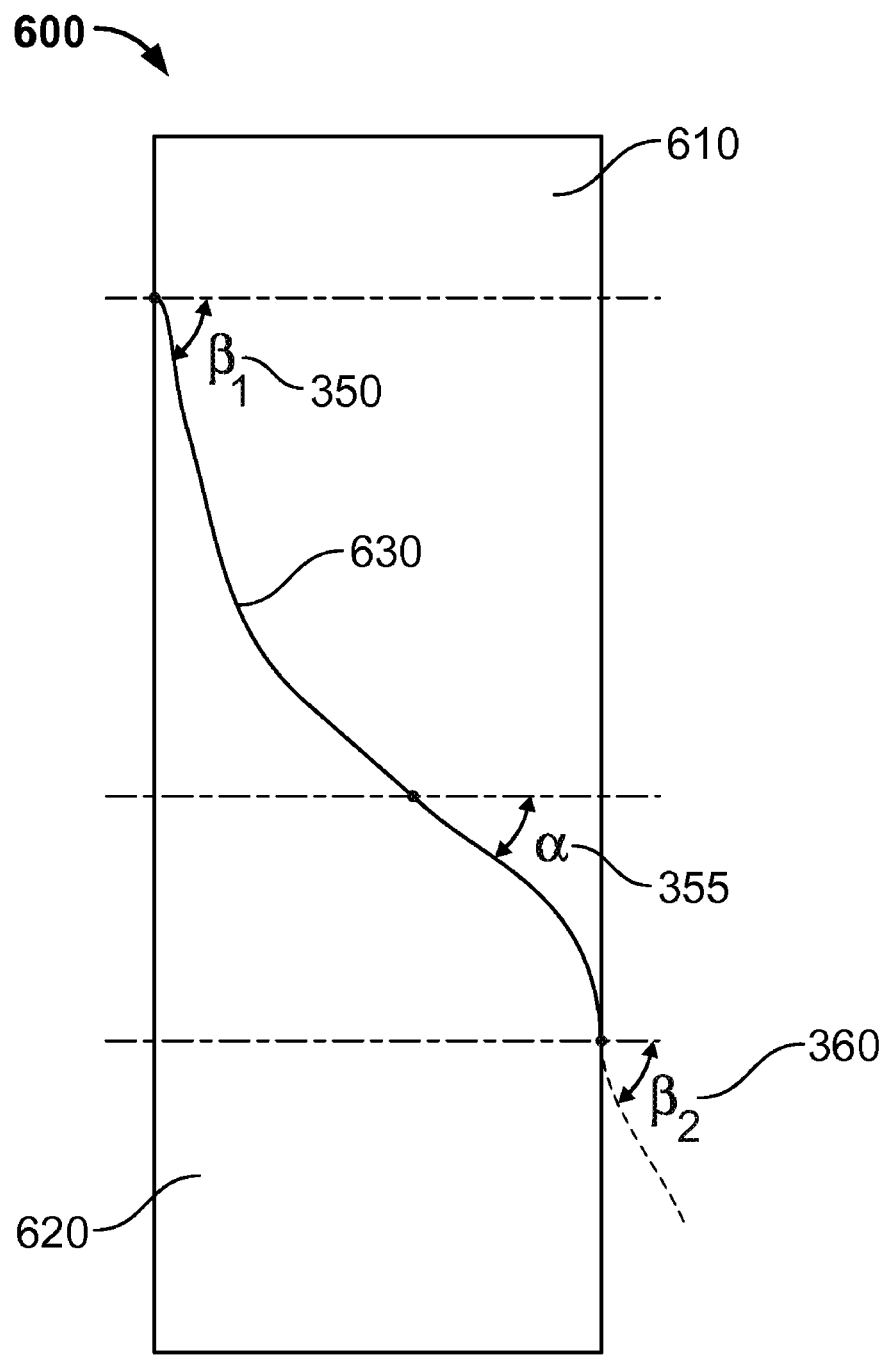
FIG. 6 is a front view of two metal strips welded using another alternative bias cut profile.

FIG. 6 is a front view of two metal strips 610 and 620 welded into a composite strip 600 using another alternative cut profile 630. The alternative cut profile 630 is a variation of the cut profile 530, including three different cut angles: the first beta angle 350, the alpha angle 355, and the second beta angle 360 set at different values. In some implementations, the first beta angle 350 and the second beta angle 360 can be determined based on different priority requirements. The second beta angle 360 is 65°. In some implementations, the second beta angle 360 can be selected from a wider range, such as between 55° and 65°. In some other implementations, the second beta angle 360 may be selected from an even wider range, such as between 50° and 80°. Compared to the bias cut profile 410 in FIGS. 4 and 530 in FIG. 5, the cut profile 630 also has unequal distances between angle transitions to the longitudinal edges.

Figure 7:
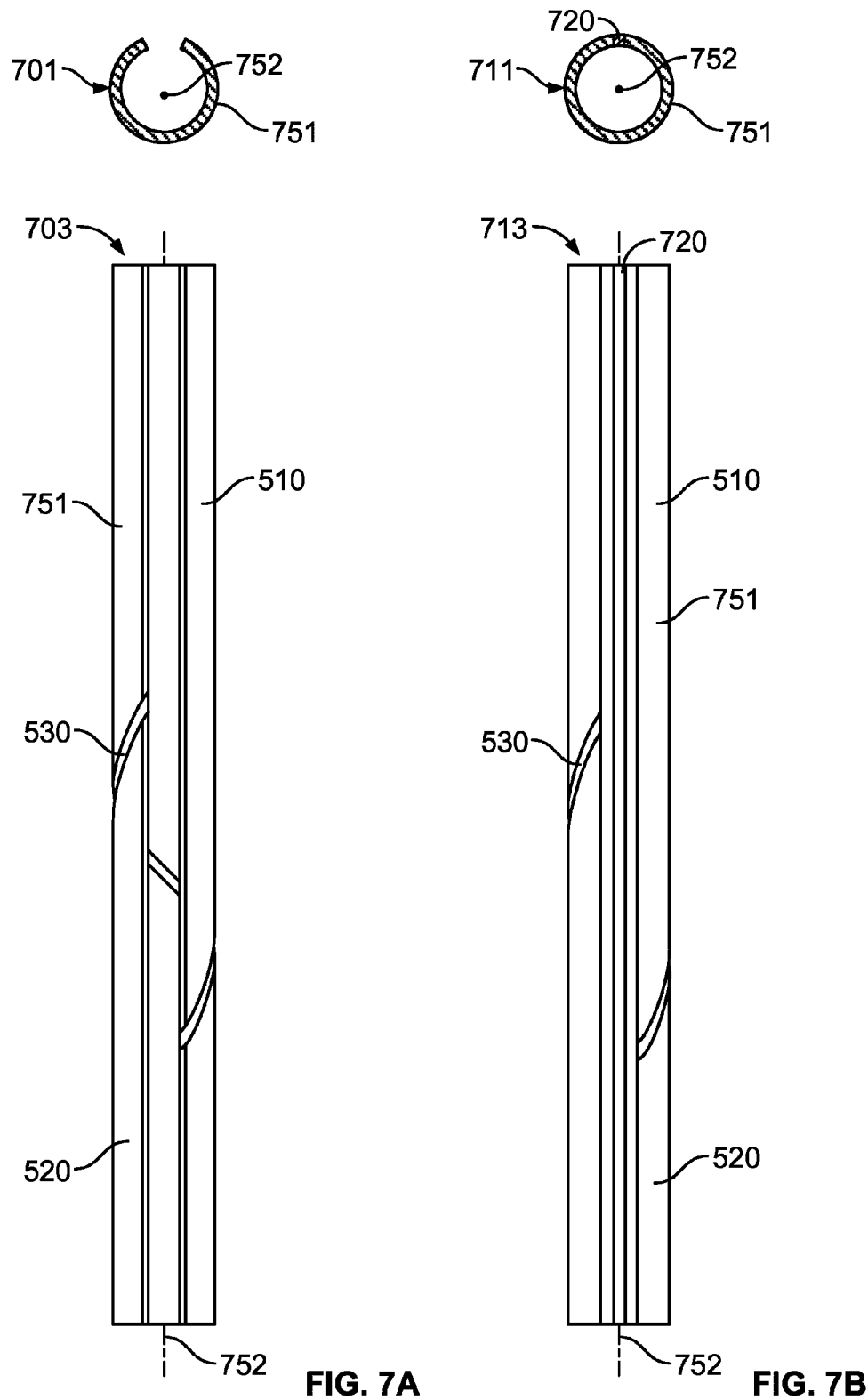
FIG. 7A illustrates a front view and a top view of a composite strip comprising the welded strips of FIG. 4 and rolled to form a metal tube.
FIG. 7B illustrates a front view and a top view of the composite strip welded along a longitudinal seam to complete a metal tube.

FIG. 7A illustrates a front view 703 and a top (end) view 701 of the welded metal strip 400 or 500 rolled to form a metal tube. The parallel longitudinal edges of the metal strip 400 or 500 are rolled toward each other to form a tubular shape. This allows the longitudinal edges to be welded in a longitudinal seam-weld 720 to complete the coiled tube manufacture, as shown in FIG. 7B. The longitudinal edges of the longitudinal seam are joined together.

FIG. 7B illustrates the front view 713 and the top (end) view 711 of the rolled (formed) metal strip 400 or 500 seam-welded at the longitudinal edges to complete a metal tube. The seam-weld 720 may form a wall having substantially the same thickness as the metal strip 500. In some implementations, the cross section of the completed metal tube as in the top view 711 is substantially circular, for example, having an outer diameter of 50.8 mm (2 inches). In some implementations, the cross section of the completed metal tube can be oval or of other shapes.

The seam-welded metal tube can be part of a length of metal tubing. In a more general sense, the metal tubing can include a composite strip of metal having a longitudinal axis and parallel longitudinal edges, which composite strip is formed into a tubular form, the longitudinal edges being welded to each other to create the metal tubing. The composite strip can include a first strip of metal material having an outer surface, a trailing end, and a trimmed leading end, the trimmed leading end having a bias cut profile beginning at a longitudinal edge of the first strip, the bias cut profile beginning with a first beta angle directed away from the trailing end of the first strip, as measured on the outer surface of the first strip from a first transverse plane perpendicular to the longitudinal axis of the composite strip. The bias cut profile forming a continuous cut that transitions from the first beta angle to an alpha angle which is smaller than the first beta angle and directed away from the trailing end of the first strip (or which is zero), as measured on the outer surface of the first strip from a second transverse plane perpendicular to the longitudinal axis of the composite strip, and then transitions from the alpha angle to a second beta angle which is larger than the first alpha angle and directed away from the trailing end of the first strip, as measured on the outer surface of the first strip from a third transverse plane perpendicular to the longitudinal axis of the composite strip, and terminates at an opposite longitudinal edge of the first strip to form a trimmed leading end of the first strip.

A second strip of metal material having an outer surface, a leading end and a trimmed trailing end matching the trimmed leading end of the first strip, the trimmed trailing end having a bias cut profile beginning at a longitudinal edge of the second strip, the bias cut profile beginning with the first beta angle directed towards the leading end of the second strip, as measured on the outer surface of the second strip from a first transverse plane perpendicular to the longitudinal axis of the composite strip, the bias cut profile forming a continuous cut that transitions from the first beta angle to the alpha angle which is smaller than the first beta angle and directed toward the leading end of the second strip (or which is zero), as measured on the outer surface of the second strip from a second transverse plane perpendicular to the longitudinal axis of the composite strip. The bias cut profile then transitions from the alpha angle to the second beta angle which is larger than the first alpha angle and directed towards the leading end of the second strip, as measured on the outer surface from a third transverse plane perpendicular to the longitudinal axis of the composite strip. The bias cut profile terminates at an opposite longitudinal edge of the second strip to form a trimmed trailing end of the second strip. The trimmed leading end of the first strip can be welded to the trimmed trailing end of the second strip.

Figure 8:
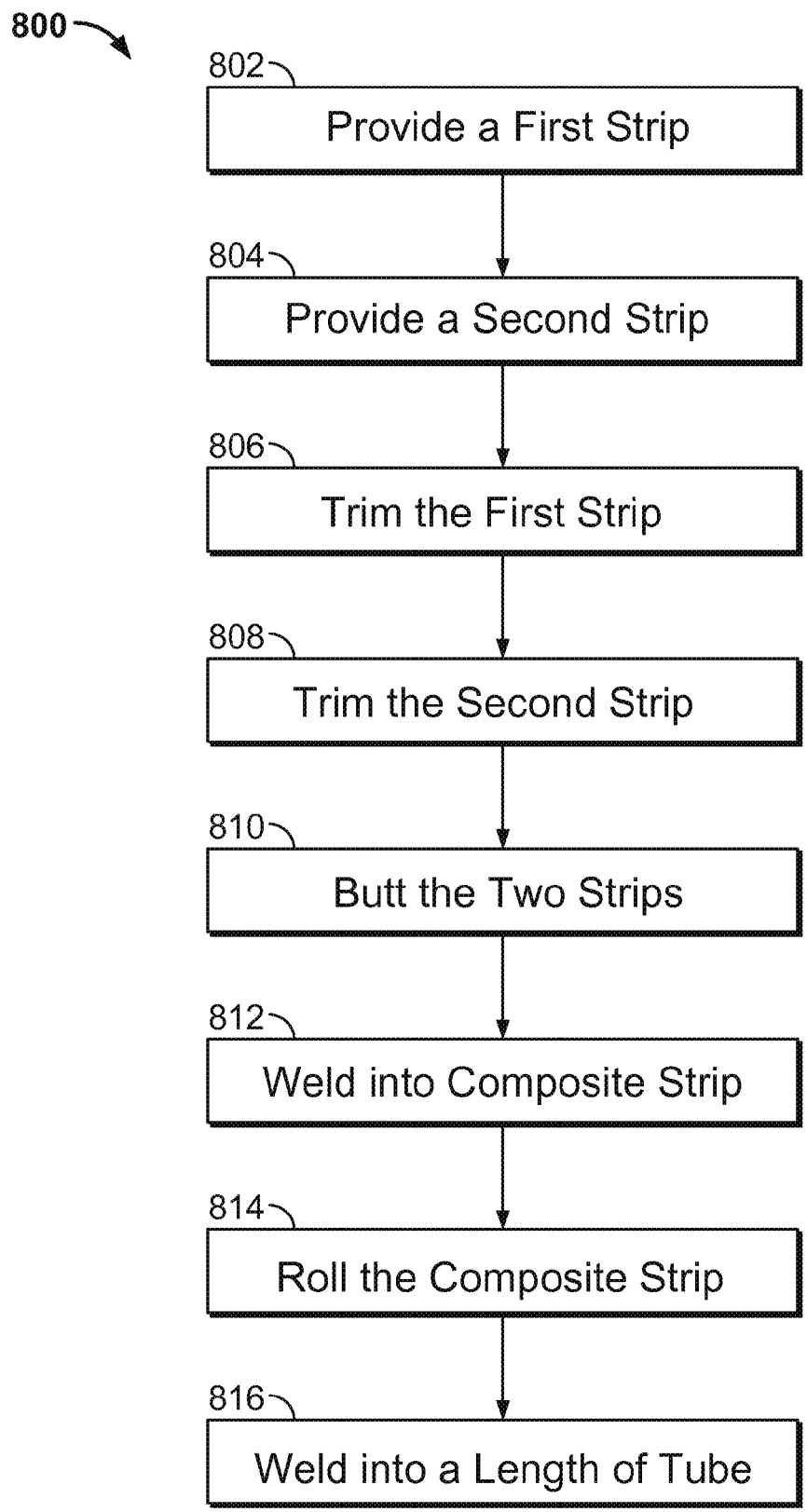
FIG. 8 is a flow chart of a method of manufacturing a metal tubing.

FIG. 8 is a flow chart 800 of a method of manufacturing a fatigue resistant metal tube. At 802, a first strip of metal material is provided. In an exemplary implementation, the first strip of metal material has a nominal thickness (e.g., 4.89 mm) and a nominal width (e.g., 160 mm). The metal material may be any metal material suitable for making coiled tubing, which allows for cyclic deformation loading as the coiled tubing unspools from and re-spools onto a reel. In some implementations the coiled tubing reel may have a pivot center having at least 1066.8 mm (42 inches) diameter to allow the coiled tubing to be flexibly spooled onto. The first strip of metal material can have four sides: a leading end, a trailing end, and two longitudinal edges.

At 804, a second strip of metal material is provided. The second strip of metal material has substantially the same nominal thickness and substantially the same nominal width as the first strip of metal material. The second strip of metal material also has four sides: a leading end, a trailing end, and two longitudinal edges. Because of the same nominal width, the two longitudinal edges of the second strip can be aligned with the two longitudinal edges of the first strip.

At 806, the leading end of the first strip is trimmed with a bias cut profile. The bias cut profile begins at one of the longitudinal edges of the first strip. The bias cut profile begins with a beta angle as measured from a transverse line perpendicular to the longitudinal edges (or any longitudinal axis). The bias cut profile forms a continuous cut that transitions from the first beta angle to a lesser alpha angle. The alpha angle is also measured from a transverse line perpendicular to the longitudinal edges. The bias cut profile then transitions from the alpha angle back to the beta angle and terminates at the other one of the two longitudinal edges. The bias cut profile forms the leading end into a trimmed leading end of the first strip. In some implementations, the bias cut profile can transition in a smooth continuous curve from the beta angle to the alpha angle and back to the beta angle, forming an "S" shape. The smooth transition may be defined by a rounding radius for a curve including an arc of a circle or may be defined by other parameters for ellipsoidal or sinusoidal curves.

At 808, the trailing end of the second strip is also trimmed with a bias cut profile. The second bias cut profile has the same cut profile as the bias cut profile applied to the leading end of the first strip: the bias cut profile also begins at one of the longitudinal edges with a beta angle. The bias cut profile forms a continuous cut that transitions from the beta angle to the alpha angle and then back to the beta angle. The bias cut profile forms the trailing end into a trimmed trailing end of the second strip.

At 810, the trimmed leading end of the first strip is adjoined together with the trimmed trailing end of the second strip. The ends of the first and the second strip engage. A welding clearance may be present between the adjoined ends.

At 812, the trimmed leading end of the first strip is welded to the trimmed trailing end of the second strip to form a composite strip with parallel longitudinal edges and substantially the same nominal width.

At 814, the parallel longitudinal edges of the composite strip are rolled toward each other to form a tubular shape. The longitudinal edges are adjoined together such that the edges engage.

At 816, the longitudinal edges of the composite strip are welded together to form a length of metal tubing.

FIG. 9 is a bar chart 900 illustrating analysis of fatigue resistance of coiled tubing of various bias cut profiles (935-939) compared to prior art designs (931-934). In the bar chart 900, the horizontal axis 920 includes nine different bias cut profiles 931 to 939. The vertical axis 910 shows remaining strength after a loading cycle; this value can be perceived as a proportional indicative to fatigue resistance. The first eight profiles 931 to 938 are applicable to the profile 410 shown in FIG. 4. The profile 939 is applicable to the profile 530 of FIG. 5. In the first four profiles 931 to 934, the first and second beta angle 350, 360 equals to the alpha angle 355 (therefore the bias cut profile is prior art and forms a straight line without any zigzag). The fifth profile 935 to the eighth profile 938 all have straight linear portions with transitions as shown in FIG. 4. They also have the first beta angle 350 held constant, and the alpha angle varied increasingly. The last profile 939 has a continuous curve transition between the straight line portions as in FIG. 5 and has the same beta and alpha angles as the profile 938.

The first four profiles 931 to 934 have illustrated the trend of high first beta angle 350 resulting in high fatigue resistance. When the first beta angle 350 is held constant, as shown in the profiles 935 to 938, an optimum alpha angle may exist. For example, when the alpha angle 355 is 37.5°, the fatigue resistance is higher than when the alpha angle is 30° or 45°. Because the weld length is shorter when the alpha angle 355 is smaller, the profile 937 is both more fatigue resistant and having a shorter weld length than the profile 938. A comparison between the profiles 938 and 939 shows that continuous curve transition can improve the fatigue resistance significantly.

A number of implementations have been described. Nevertheless, it will be understood that various modifications may be made. Further, the method 700 may include fewer steps than those illustrated or more steps than those illustrated. In addition, the illustrated steps of the method 700 may be performed in the respective orders illustrated or in different orders than that illustrated. As a specific example, the method 700 may be performed simultaneously (e.g., substantially or otherwise). Other variations in the order of steps are also possible. Accordingly, other implementations are within the scope of the following claims.

What is claimed is:

1. A method of manufacturing a length of metal tubing comprising:
    providing a first strip of metal material having a surface, a nominal width, a leading end, and a trailing end;
    providing a second strip of metal material having a surface, substantially the same nominal width as the first strip, a leading end, and a trailing end;
    trimming the leading end of the first strip of metal material with a bias cut profile beginning at a longitudinal edge of the first strip, said bias cut profile beginning with a first beta angle directed away from the trailing end of the first strip, as measured on the surface of the first strip from a first transverse plane perpendicular to a longitudinal axis of the first strip, said bias cut profile forming a continuous cut that transitions from the first beta angle to an alpha angle which is smaller than the first beta angle and directed away from the trailing end of the first strip, as measured on the surface of the first strip from a second transverse plane perpendicular to the longitudinal axis of the first strip, and then transitions from the alpha angle to a second beta angle which is larger than the first alpha angle and directed away from the trailing end of the first strip, as measured on the surface of the first strip from a third transverse plane perpendicular to the longitudinal axis of the first strip, and terminates at an opposite longitudinal edge of the first strip to form a trimmed leading end;

trimming the trailing end of the second strip of metal material with a bias cut profile matching the trimmed leading end of the first strip, said bias cut profile beginning at a longitudinal edge of the second strip, said bias cut profile beginning with the first beta angle directed toward the leading end of the second strip, as measured on the surface of the second strip from a first transverse plane perpendicular to a longitudinal axis of the second strip, said bias cut profile forming a continuous cut that transitions from the first beta angle to the alpha angle which is smaller than the first beta angle and directed towards the leading end of the second strip, as measured on the surface of the second strip from a second transverse plane perpendicular to the longitudinal axis of the second strip, and then transitions from the alpha angle to the second beta angle which is larger than the alpha angle and directed towards the leading end of the second strip, as measured on the surface of the second strip from a third transverse plane perpendicular to the longitudinal axis of the second strip, and terminates at an opposite longitudinal edge of the second strip to form a trimmed trailing end;

welding the trimmed leading end of the first strip to the trimmed trailing end of the second strip to form a composite strip with parallel longitudinal edges and substantially a uniform nominal width over its length;

forming the composite strip into a tubular shape with the parallel longitudinal edges of the composite strip positioned adjacent to each other; and welding the longitudinal edges of the composite strip together to create the length of metal tubing.

2. The method of claim 1, wherein the first beta angle and the second beta angle are substantially equal.

3. The method of claim 1, wherein said bias cut profile begins with a first linear portion having said first beta angle, the first linear portion transitions to an intermediate linear portion having said alpha angle, and the intermediate portion transitions to a second linear portion having said second beta angle.

4. The method of claim 1, wherein said bias cut profile beginning with the first beta angle transitions in a first continuous curve from the first beta angle to the alpha angle and then transitions from the alpha angle to the second beta angle in a second continuous curve.

5. The method of claim 1, wherein the method comprises trimming the leading end of the first strip with the bias cut profile having the first and second beta angle between 50° and 80° and directing away from the trailing end of the first strip, as measured on the surface of the first strip from the first and third transverse plane perpendicular to the longitudinal axis of the first strip, respectively, and the method comprises trimming the trailing end of the second strip with the bias cut profile having the first and second beta angle between 50° and 80° and directing towards the leading end of the second strip, as measured on the surface of the second strip from the first and third transverse plane perpendicular to the longitudinal axis of the second strip, respectively.

6. The method of claim 1, wherein the method comprises trimming the leading end of the first strip with the bias cut profile having the first and second beta angle between 55° and 65° and directing away from the trailing end of the first strip, as measured on the surface of the first strip from the first and third transverse plane perpendicular to the longitudinal axis of the first strip, respectively, and the method comprises trimming the trailing end of the second strip with the bias cut profile having the first and second beta angle between 55° and 65° and directing towards the leading end of the second strip, as measured on the surface of the second strip from the first and third transverse plane perpendicular to the longitudinal axis of the second strip.

7. The method of claim 1, wherein the method comprises trimming the leading end of the first strip with the bias cut profile having the first and second beta angle at 60° and directing away from the trailing end of the first strip, as measured on the surface of the first strip from the first and third transverse plane perpendicular to the longitudinal axis of the first strip, respectively, and the method comprises trimming the trailing end of the second strip with the bias cut profile having the first and second beta angle at 60° and directing towards the leading end of the second strip, as measured on the surface of the second strip from the first and third transverse plane perpendicular to the longitudinal axis of the second strip, respectively.

8. The method of claim 1, wherein the method comprises trimming the leading end of the first strip with the bias cut profile having the alpha angle between 15° and 45° and directing away from the leading end of the first strip, as measured on the surface of the first strip from the second transverse plane perpendicular to the longitudinal axis of the first strip, and the method comprises trimming the trailing end of the second strip with the bias cut profile having the alpha angle between 15° and 45° and directing towards the leading end of the second strip, as measured on the surface of the second strip from the second transverse plane perpendicular to the longitudinal axis of the second strip.

9. The method of claim 1, wherein the method comprises trimming the leading end of the first strip with the bias cut profile having the alpha angle between 30° and 45° and directing away from the trailing end of the first strip, as measured on the surface of the first strip from the second transverse plane perpendicular to the longitudinal axis of the first strip, and the method comprises trimming the trailing end of the second strip with the bias cut profile having the alpha angle between 30° and 45° and directing towards the leading end of the second strip, as measured on the surface of the second strip from the second transverse line perpendicular to the longitudinal axis of the second strip.

10. The method of claim 1, wherein the method comprises trimming the leading end of the first strip with the bias cut profile having the alpha angle at 37.5 degrees and directing away from the trailing end of the first strip, as measured on the surface of the first strip from the second transverse plane perpendicular to the longitudinal axis of the first strip, and the method comprises trimming the trailing end of the second strip with the bias cut profile having the alpha angle of the second strip at 37.5 degrees and directing towards the leading end of the second strip, as measured on the surface of the second strip from the second transverse line perpendicular to the longitudinal axis of the second strip.

11. The method of claim 1, wherein in the first and second strip, the bias cut profile begins with a first linear portion having said first beta angle, the first linear portion transitions to an intermediate linear portion having said alpha angle, the intermediate linear portion transitions to a second linear portion having said second beta angle, and the bias cut profile comprises a smooth transition defined by a first rounding radius between the first linear portion and the intermediate portion and a smooth transition defined by a second rounding radius between the intermediate portion and the second linear portion.

12. The method of claim 1, wherein in the first strip, the distance between the longitudinal edge and a first transition location where the bias cut profile transitions from the first beta angle to the alpha angle, as measured on the surface of the first strip in a direction perpendicular to the longitudinal axis of the first strip, is substantially the same as the distance between the opposite longitudinal edge and a second transition location where the bias cut profile transitions from the alpha angle to the second beta angle, as measured on the surface of the first strip in a direction perpendicular to the longitudinal axis of the first strip, and wherein in the second strip, the distance between the longitudinal edge and a first transition location where the bias cut profile transitions from the first beta angle to the alpha angle, as measured on the surface of the second strip in a direction perpendicular to the longitudinal axis of the second strip, is substantially the same as the distance between the opposite longitudinal edge and a second transition location where the bias cut profile transitions from the alpha angle to the second beta angle, as measured on the surface of the second strip in a direction perpendicular to the longitudinal axis of the second strip.

13. The method of claim 1, wherein in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is substantially the same as the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is substantially the same as the distance between the longitudinal edge and said first transition location, as measured on the surface of the second strip in a direction perpendicular to the longitudinal axis of the second strip.

14. The method of claim 1, wherein in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is larger than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is larger than the distance between the longitudinal edge and said first transition location, as measured on the surface of the second strip in a direction perpendicular to the longitudinal axis of the second strip.

15. The method of claim 1, wherein in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is smaller than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is smaller than the distance between the longitudinal edge and said first transition location, as measured on the surface of the second strip in a direction perpendicular to the longitudinal axis of the second strip.

16. The method of claim 12, wherein in the first strip, the distance between the first transition location where the bias cut profile transitions from the first beta angle to the alpha angle and the second transition location where the bias cut profile transitions from the alpha angle to the second beta angle, as measured on the surface of the first strip in a direction perpendicular to the longitudinal axis of the first strip, is extended to shorten the bias cut profile of the first strip, and wherein in the second strip, the distance between the first transition location where the bias cut profile transitions from the first beta angle to the alpha angle and the second transition location where the bias cut profile transitions from the alpha angle to the second beta angle, as measured on the surface of the second strip in a direction perpendicular to the longitudinal axis of the second strip, is extended to shorten the bias cut profile of the second strip.

17. The method of claim 12, wherein in the first strip, the distance between the first transition location where the bias cut profile transitions from the first beta angle to the alpha angle and the second transition location where the bias cut profile transitions from the alpha angle to the second beta angle, as measured on the surface of the first strip in a direction perpendicular to the longitudinal axis of the first strip, is shortened to extend the bias cut profile of the first strip, and wherein in the second strip, the distance between the first transition location where the bias cut profile transitions from the first beta angle to the alpha angle and the second transition location where the bias cut profile transitions from the alpha angle to the second beta angle, as measured on the surface of the second strip in a direction perpendicular to the longitudinal axis of the second strip, is shortened to extend the bias cut profile of the second strip.

18. A length of metal tubing formed from strips of metal welded together, said metal tubing comprising:
  a composite strip of metal having a longitudinal axis and parallel longitudinal edges, which composite strip is formed into a tubular form, said longitudinal edges being welded to each other to create the metal tubing; and
  wherein said composite strip comprises a first strip of metal material having an outer surface, a trailing end, and a trimmed leading end, said trimmed leading end having a bias cut profile beginning at a longitudinal edge of the first strip, said bias cut profile beginning with a first beta angle directed away from the trailing end of the first strip, as measured on the outer surface of the first strip from a first transverse plane perpendicular to the longitudinal axis of the composite strip, said bias cut profile forming a continuous cut that transitions from the first beta angle to an alpha angle which is smaller than the first beta angle and directed away from the trailing end of the first strip, as measured on the outer surface of the first strip from a second transverse plane perpendicular to the longitudinal axis of the composite strip, and then transitions from the alpha angle to a second beta angle which is larger than the first alpha angle and directed away from the trailing end of the first strip, as measured on the outer surface of the first strip from a third transverse plane perpendicular to the longitudinal axis of the composite strip, and terminates at an opposite longitudinal edge of the first strip to form a trimmed leading end of the first strip, and a second strip of metal material having an outer surface, a leading end and a trimmed trailing end matching the trimmed leading end of the first strip, said trimmed trailing end having a bias cut profile beginning at a longitudinal edge of the second strip, said bias cut profile beginning with the first beta angle directed towards the leading end of the second strip, as measured on the outer surface of the second strip from a first transverse plane perpendicular to the longitudinal axis of the composite strip, said bias cut profile forming a continuous cut that transitions from the first beta angle to the alpha angle which is smaller than the first beta angle and directed toward the leading end of the second strip, as measured on the outer surface of the second strip from a second transverse plane perpendicular to the longitudinal axis of the composite strip, and then transitions from the alpha angle to the second beta angle which is larger than the first alpha angle and directed towards the leading end of the second strip, as measured on the outer surface from a third transverse plane perpendicular to the longitudinal axis of the composite strip, and terminates at an opposite longitudinal edge of the second strip to form a trimmed trailing end of the second strip, and wherein the trimmed leading end of the first strip is welded to the trimmed trailing end of the second strip.

19. The length of metal tubing of claim 18, wherein the first beta angle and the second beta angle are substantially equal.

20. The length of metal tubing of claim 18, wherein said bias cut profile begins with a first linear portion having said first beta angle and partly surrounding the longitudinal axis of the composite strip, the first linear portion transitions to an intermediate linear portion having said alpha angle and partly surrounding the longitudinal axis of the composite strip, and the intermediate linear portion transitions to a second linear portion having said second beta angle and partly surrounding the longitudinal axis of the composite strip.

21. The length of metal tubing of claim 18, wherein said bias cut profile beginning with the first beta angle transitions in a first continuous curve from the first beta angle to the alpha angle and then transitions from the alpha angle to the second beta angle in a second continuous curve.

22. The length of metal tubing of claim 18, wherein the first and second beta angle of the bias cut profile of the first strip is between 50° and 80° and directing away from the trailing end of the first strip, as measured on the surface of the first strip from the first and third transverse plane perpendicular to the longitudinal axis of the composite strip, respectively, and the first and second beta angle of the bias cut profile of the second strip is between 50° and 80° and directing towards the leading end of the second strip, as measured on the surface of the second strip from the first and third transverse plane perpendicular to the longitudinal axis of the composite strip, respectively.

23. The length of metal tubing of claim 18, wherein the first and second beta angle of the bias cut profile of the first strip is between 55° and 65° and directing away from the trailing end of the first strip, as measured on the surface of the first strip from the first and third transverse plane perpendicular to the longitudinal axis of the composite strip, respectively, and the first and second beta angle of the bias cut profile of the second strip is between 55° and 65° and directing towards the leading end of the second strip, as measured on the surface of the second strip from the first and third transverse plane perpendicular to the longitudinal axis of the composite strip, respectively.

24. The length of metal tubing of claim 18, wherein the first and second beta angle of the bias cut profile of the first strip is 60° and directing away from the trailing end of the first strip, as measured on the surface of the first strip from the first and third transverse plane perpendicular to the longitudinal axis of the composite strip, respectively, and the first and second beta angle of the bias cut profile of the second strip is 60° and directing towards the leading end of the second strip, as measured on the surface of the second strip from the first and third transverse plane perpendicular to the longitudinal axis of the composite strip, respectively.

25. The length of metal tubing of claim 18, wherein the alpha angle of the bias cut profile of the first strip is between 15° and 45° and directing away from the trailing end of the first strip, as measured on the surface of the first strip from the second transverse plane perpendicular to the longitudinal axis of the composite strip, and the alpha angle of the bias cut profile of the second strip is between 15° and 45° and directing towards the leading end of the second strip, as measured on the surface of the second strip from the second transverse plane perpendicular to the longitudinal axis of the composite strip.

26. The length of metal tubing of claim 18, wherein the alpha angle of the bias cut profile of the first strip is between 30° and 45° and directing away from the trailing end of the first strip, as measured on the surface of the first strip from the second transverse plane perpendicular to the longitudinal axis of the composite strip, and the alpha angle of the bias cut profile of the second strip is between 30° and 45° and directing towards the leading end of the second strip, as measured on the surface of the second strip from the second transverse plane perpendicular to the longitudinal axis of the composite strip.

27. The length of metal tubing of claim 18, wherein the alpha angle of the bias cut profile of the first strip is 37.5° and directing away from the trailing end of the first strip, as measured on the surface of the first strip from the second transverse line perpendicular to the longitudinal axis of the composite strip, and the beta angle of the bias cut profile of the second strip is 37.5° and directing towards the leading end of the second strip, as measured on the surface of the second strip from the second transverse plane perpendicular to the longitudinal axis of the composite strip.

28. The length of metal tubing of claim 18, wherein in the first and second strip, the bias cut profile begins with a first linear portion having said first beta angle and partly surrounding the longitudinal axis of the composite strip, the first linear portion transitions to an intermediate linear portion having said alpha angle and partly surrounding the longitudinal axis of the composite strip, the intermediate linear portion transitions to a second linear portion having said second beta angle and partly surrounding the longitudinal axis of the composite strip, and the bias cut profile comprises a smooth transition defined by a first rounding radius between the first linear portion and the intermediate portion and a smooth transition defined by a second rounding radius between the intermediate portion and the second linear portion.

29. The length of metal tubing of claim 18, wherein in the first strip, the distance of between the longitudinal edge and the transverse a first transition location where the bias cut profile transitions from the first beta angle to the alpha angle to the longitudinal edge, as measured on the surface of the first strip in a direction perpendicular to the longitudinal axis of the first strip, is substantially the same as the distance of between the opposite longitudinal edge and a the transverse second transition location where the bias cut profile transitions from the alpha angle back to the second beta angle to the opposite longitudinal edge, as measured on the surface of the first strip in a direction perpendicular to the longitudinal axis of the first strip, and wherein. in the second strip, the distance between the longitudinal edge and a first transition location where the bias cut profile transitions from the first beta angle to the alpha angle, as measured on the surface of the second strip in a direction perpendicular to the longitudinal axis of the second strip, is substantially the same as the distance between the opposite longitudinal edge and a second transition location where the bias cut profile transitions from the alpha angle to the second beta angle, as measured on the surface of the second strip in a direction perpendicular to the longitudinal axis of the second strip.

30. The length of metal tubing of claim 18, wherein in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is substantially the same as the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is substantially the same as the distance between the longitudinal edge and said first transition location, as measured on the surface of the second strip in a direction perpendicular to the longitudinal axis of the second strip.

31. The length of metal tubing of claim 18, wherein in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is larger than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is larger than the distance between the longitudinal edge and said first transition location, as measured on the surface of the second strip in a direction perpendicular to the longitudinal axis of the second strip.

32. The length of metal tubing of claim 18, wherein in the first strip, the distance between a first transition location where the bias cut profile transitions from the first beta angle to the alpha angle and a second transition location where the bias cut profile transitions from the alpha angle to the second beta angle, as measured on the surface of the first strip in a direction perpendicular to the longitudinal axis of the first strip, is smaller than the distance between the longitudinal edge and said first transition location, as measured on the surface of the first strip in a direction perpendicular to the longitudinal axis of the first strip, and wherein in the second strip, the distance between a first transition location where the bias cut profile transitions from the first beta angle to the alpha angle and a second transition location where the bias cut profile transitions from the alpha angle to the second beta angle, as measured on the surface of the second strip in a direction perpendicular to the longitudinal axis of the second strip, is smaller than the distance between the longitudinal edge and said first transition location, as measured on the surface of the second strip in a direction perpendicular to the longitudinal axis of the second strip.

33. A method of manufacturing a continuous length of coiled tubing, said method comprising:
manufacturing a length of metal tubing comprising:
providing a first strip of metal material having a surface, a nominal width, a leading end, and a trailing end;
providing a second strip of metal material having a surface, substantially the same nominal width as the first strip, a leading end, and a trailing end;
trimming the leading end of the first strip of metal material with a bias cut profile beginning at a longitudinal edge of the first strip, said bias cut profile beginning with a first beta angle directed away from the trailing end of the first strip, as measured on the surface of the first strip from a first transverse plane perpendicular to a longitudinal axis of the first strip, said bias cut profile forming a continuous cut that transitions from the first beta angle to an alpha angle which is smaller than the first beta angle and directed away from the trailing end of the first strip as measured on the surface of the first strip from a second transverse plane perpendicular to the longitudinal axis of the first strip, and then transitions from the alpha angle to a second beta angle which is larger than the first alpha angle and directed away from the trailing end of the first strip, as measured on the surface of the first strip from a third transverse plane perpendicular to the longitudinal axis of the first strip, and terminates at an opposite longitudinal edge of the first strip to form a trimmed leading end;
trimming the trailing end of the second strip of metal material with a bias cut profile matching the trimmed leading end of the first strip, said bias cut profile beginning at a longitudinal edge of the second strip, said bias cut profile beginning with the first beta angle directed toward the leading end of the second strip, as measured on the surface of the second strip from a first transverse plane perpendicular to a longitudinal axis of the second strip, said bias cut profile forming a continuous cut that transitions from the first beta angle to the alpha angle which is smaller than the first beta angle and directed towards the leading end of the second strip, as measured on the surface of the second strip from a second transverse plane perpendicular to the longitudinal axis of the second strip, and then transitions from the alpha angle to the second beta angle which is larger than the alpha angle and directed towards the leading end of the second strip, as measured on the surface of the second strip from a third transverse plane perpendicular to the longitudinal axis of the second strip, and terminates at an opposite longitudinal edge of the second strip to form a trimmed trailing end;

welding the trimmed leading end of the first strip to the trimmed trailing end of the second strip to form a composite strip with parallel longitudinal edges and substantially a uniform nominal width over its length;

forming the composite strip into a tubular shape with the parallel longitudinal edges of the composite strip positioned adjacent to each other;

welding the longitudinal edges of the composite strip together to create the length of metal tubing;

welding a plurality of the lengths of tubing together end to end thereby forming a continuous string of tubing; and spooling the continuous string of tubing onto a spool thereby forming a coiled tubing string.

34. A method of using a continuous length of a coiled tubing in a wellbore, said method comprising:

manufacturing a length of metal tubing comprising:

providing a first strip of metal material having a surface, a nominal width, a leading end, and a trailing end;

providing a second strip of metal material having a surface, substantially the same nominal width as the first strip, a leading end, and a trailing end;

trimming the leading end of the first strip of metal material with a bias cut profile beginning at a longitudinal edge of the first strip, said bias cut profile beginning with a first beta angle directed away from the trailing end of the first strip, as measured on the surface of the first strip from a first transverse plane perpendicular to a longitudinal axis of the first strip, said bias cut profile forming a continuous cut that transitions from the first beta angle to an alpha angle which is smaller than the first beta angle and directed away from the trailing end of the first strip as measured on the surface of the first strip from a second transverse plane perpendicular to the longitudinal axis of the first strip, and then transitions from the alpha angle to a second beta angle which is larger than the first alpha angle and directed away from the trailing end of the first strip, as measured on the surface of the first strip from a third transverse plane perpendicular to the longitudinal axis of the first strip, and terminates at an opposite longitudinal edge of the first strip to form a trimmed leading end;

trimming the trailing end of the second strip of metal material with a bias cut profile matching the trimmed leading end of the first strip, said bias cut profile beginning at a longitudinal edge of the second strip, said bias cut profile beginning with the first beta angle directed toward the leading end of the second strip, as measured on the surface of the second strip from a first transverse plane perpendicular to a longitudinal axis of the second strip, said bias cut profile forming a continuous cut that transitions from the first beta angle to the alpha angle which is smaller than the first beta angle and directed towards the leading end of the second strip, as measured on the surface of the second strip from a second transverse plane perpendicular to the longitudinal axis of the second strip, and then transitions from the alpha angle to the second beta angle which is larger than the alpha angle and directed towards the leading end of the second strip, as measured on the surface of the second strip from a third transverse plane perpendicular to the longitudinal axis of the second strip, and terminates at an opposite longitudinal edge of the second strip to form a trimmed trailing end;

welding the trimmed leading end of the first strip to the trimmed trailing end of the second strip to form a composite strip with parallel longitudinal edges and substantially a uniform nominal width over its length;

forming the composite strip into a tubular shape with the parallel longitudinal edges of the composite strip positioned adjacent to each other;

welding the longitudinal edges of the composite strip together to create the length of metal tubing;

welding a plurality of the lengths of tubing together end to end thereby forming a continuous string of tubing;

spooling the continuous string of tubing onto a spool thereby forming a continuous coiled tubing string;

positioning the spool with the coiled tubing strings pooled thereon proximal to a wellbore;

disposing a distal end of the coiled tubing string into the upper end of the wellbore;

unspooling portions of the continuous coiled tubing string from the spool and simultaneously lowering the distal end of the coiled tubing string into the wellbore; and pumping fluid into the proximal end of the coiled tubing string and through the coiled tubing string and through the distal end of the tubing string disposed in the wellbore.

* * * * *